(12) United States Patent
Halberstadt (10) Patent No.: US 10,218,281 B2
(45) Date of Patent: Feb. 26, 2019

(54) SWITCH MODE POWER SUPPLIES, CONTROL ARRANGEMENTS THEREFOR AND METHODS OF OPERATING THEREOF

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/062,139

(22) Filed: Mar. 6, 2016

(65) Prior Publication Data

US 2016/0270172 A1   Sep. 15, 2016

(30) Foreign Application Priority Data

Mar. 10, 2015   (EP) ..................................... 15158372

(51) Int. Cl.
*H05B 33/08* (2006.01)
*H02M 3/335* (2006.01)
*H02M 1/00* (2006.01)

(52) U.S. Cl.
CPC ......... *H02M 3/33523* (2013.01); *H02M 1/00* (2013.01); *H05B 33/0815* (2013.01); *H02M 2001/0025* (2013.01); *H02M 2001/0032* (2013.01); *Y02B 70/16* (2013.01)

(58) Field of Classification Search
CPC ........................ H05B 33/0815; H02M 3/33523
See application file for complete search history.

(56) References Cited

U.S. PATENT DOCUMENTS

| | | |
|---|---|---|
| 5,949,225 A | 9/1999 | Sawtell |
| 2010/0219799 A1 | 9/2010 | Minkner et al. |
| 2010/0270982 A1 | 10/2010 | Hausman, Jr. et al. |
| 2011/0018590 A1* | 1/2011 | Tai .................... H02M 3/33523 327/103 |
| 2014/0016373 A1 | 1/2014 | Zhang et al. |
| 2014/0140107 A1 | 5/2014 | Chen et al. |
| 2014/0301117 A1 | 10/2014 | Hirabayashi |
| 2016/0094062 A1 | 3/2016 | Osswald et al. |
| 2016/0270171 A1 | 9/2016 | Lim et al. |

OTHER PUBLICATIONS

Extended European Search Report for Application No. 15158372.1 (dated Sep. 1, 2015).

(Continued)

*Primary Examiner* — Douglas W Owens
*Assistant Examiner* — Pedro C Fernandez (57) ABSTRACT

A control arrangement is disclosed for a switch mode power supply (SMPS) operable in a burst mode and comprising an opto-coupler configured to transfer, from a secondary side to a primary side of the switch mode power supply by means of an LED current, a control signal indicative of a time-varying error between a reference signal and a signal indicative of an actual value of an output parameter, the control arrangement comprising: an error amplifier configured to operate as a proportional-integrating error amplifier to determine the LED current from the time-varying; and a feedback loop configured to adjust the magnitude of the LED current between bursts by modifying the time-dependant error. A SMPS comprising such a control arrangement, and a corresponding method is also disclosed.

13 Claims, 5 Drawing Sheets

(56) References Cited

OTHER PUBLICATIONS

Non Final Office Action, U.S. Appl. No. 15/556,133, 31 pages (dated Feb. 26, 2018).
An Analog Electronics Companion: Basic Circuit Design for Engineers and Scientists by Scott Hamilton, Published since 2003 Section 5.5 as quoted in article 5.5.: Integrators from IEEE, retrieved from https://www.globalspec.com/reference/53124/203279/5-5-Integrators.
Final Office Action, U.S. Appl. No. 15/556,133, 26 pages (dated Jul. 17, 2018).
https://en.wikipedia.org/wiki/Op_amp_integrator, available since Jul. 4, 2012, See, https://web.archive.org/web/20121101084628/http://en.wikipedia.org:80/wiki/Op_amp_integrator.
Non Final Office Action; U.S. Appl. No. 15/556,133, 18 pages. (dated Oct. 29, 2018).

* cited by examiner

SWITCH MODE POWER SUPPLIES, CONTROL ARRANGEMENTS THEREFOR AND METHODS OF OPERATING THEREOF

CROSS-REFERENCE TO RELATED APPLICATIONS

This application claims the priority under 35 U.S.C § 119 of European patent application No. 15158372.1, Mar. 10, 2015 filed the contents of which are incorporated by reference herein.

FIELD

This invention relates to switch mode power supplies, control arrangements therefore and methods of operating switch mode power supplies.

BACKGROUND

In many varieties of switch mode power supplies, an output parameter—typically output voltage—is regulated by means of an error derived in an error amplifier on the output or secondary side of the SMPS; a signal corresponding to the error is transmitted to the primary or input side, typically by means of an opto-coupler to maintain electrical isolation between the input and output sides. Such power supplies are often used in combination with consumer applications, such as adapters for laptops, cell phones, TV, desktop PCs and the like.

Whereas opto-couplers used in such power supplies typically output a low current, for example of the order of 80 μA, this may still require a current supply to the LED of, say 400 μA for a current transfer ratio of 0.2. Under low-load, or "no-load" conditions, this current represents a significant fraction of the power consumed by the SMPS. Since the electronic equipment connected to many such power supplies is typically left in an "off" or "standby" state for extended periods of time, the corresponding low load or no-load power consumption of switch mode power supplies is coming under increasing scrutiny with tightening requirements on wasted power, and in particular the power dissipated under low load or no-load conditions.

SUMMARY

According to a first aspect of the present disclosure, there is provided a control arrangement for a switch mode power supply operable in a burst mode and comprising an opto-coupler configured to transfer a control signal indicative of a time-varying error between a reference signal and a signal indicative of an actual value of an output parameter from a secondary side to a primary side of the switch mode power supply by means of an LED current, the control arrangement comprising: an error amplifier configured to operate as a proportional-integrating error amplifier to derive the LED current from the time-dependant error; and a feedback loop configured to adjust the magnitude of the LED current between bursts by modifying the time-dependant error. The power supply may also be operable in a normal mode. It will be appreciated that configuring the error amplifier to operate as a proportional-integrating error amplifier need not preclude the amplifier from having additional functionality. In particular it may also have a differentiating functionality, and operation as a proportional-integrating error amplifier may include operation as a proportional-integrating-differentiating, or "PID", error amplifier.

It may thus be possible to reduce the LED current—one or both of instantaneous and average—in the opto-coupler, thereby reducing losses in the SMPS, during the intervals between bursts when the SMPS is operating in burst mode, relative to a SMPS which does not have such a feedback loop.

The output parameter may be output voltage.

Since it is the integrating function of the error amplifier which can result in a build-up of charge in an integrator, by providing that the feedback loop modifies the integrating function it may be possible to provide a solution which impacts the other aspect of operation of the error amplifier to only a small, or even negligible, extent. Thus, operation within bursts, or operation in another operating mode such as a normal mode which is not a burst mode, may be unaffected or substantially unaffected.

In one or more embodiments the feedback loop comprises a resistor. In particular, the resistor may be in a current path of the LED current; the resistor may be in a ground path of the proportional-integrating error amplifier. The skilled person would appreciate that the error amplifier may be otherwise configured so the resistor is in another path, such as a local ground. For example the current path of the LED current may be directly connected to the PI error amplifier through a local ground. The resistor may have a value between 10 ohms and 100 ohms, and in an example implementation the resistor may have a value of 20 ohms.

In one more embodiments the burst mode has a repetition period which is longer than 50ms.

According to another aspect of the present disclosure there is provided a switch mode power supply, comprising a control arrangement as set forth above, and an opto-coupler. In particular the opt-coupler may be distinct from the control arrangement, and the opto-coupler may be configured to transfer a control signal indicative of a time-varying error between a reference signal and a signal indicative of an actual value of an output parameter from a secondary side to a primary side of the switch mode power supply by means of an LED current.

In one or more embodiments, the control signal may be used on the primary side of the SMPS to determine a timing between successive bursts.

According to a further aspect of the present disclosure there is provided a method of controlling a switch mode power supply operable in a burst mode and comprising an opto-coupler configured to transfer, from a secondary side to a primary side of the switch mode power supply by means of an LED current, a control signal indicative of a time-varying error between a reference signal and a signal indicative of an actual value of an output parameter, the method comprising: deriving an LED current from the time-varying error by a proportional-integrating error amplifier; and adjusting the magnitude of the LED current between bursts by modifying the time-dependant error by a feedback loop.

In one or more embodiments adjusting the magnitude of the LED current is effected in a feedback loop. In one or more embodiments the feedback loop comprises a resistor in the ground path of the proportional-integrating error amplifier.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

Figure 1:
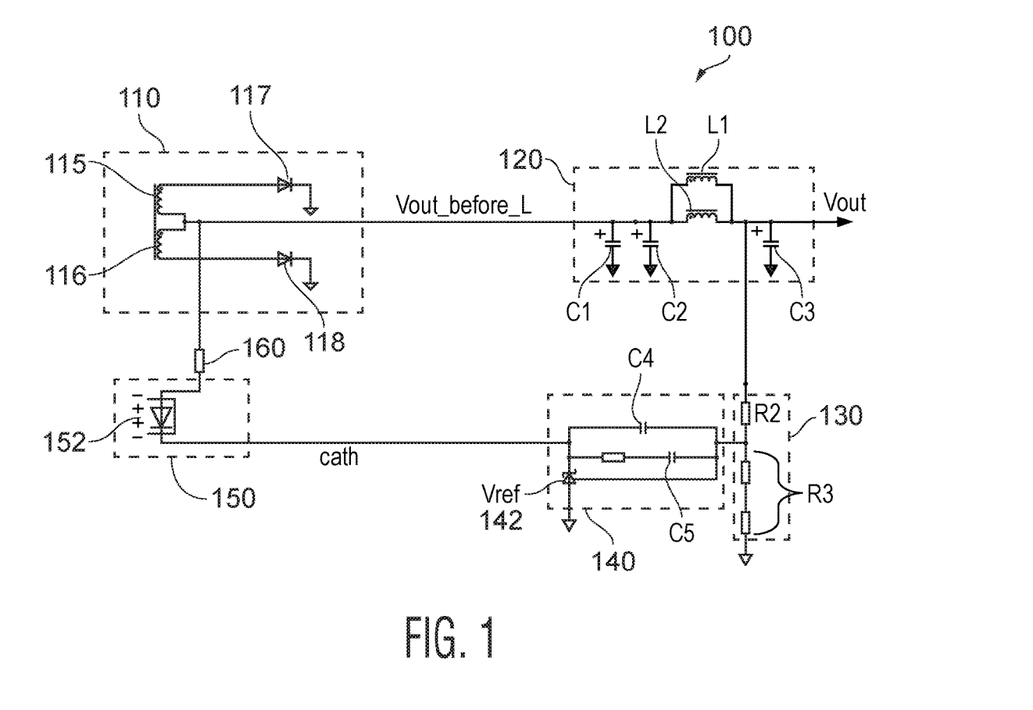
FIG. 1 shows an example of a circuit arrangement for controlling a SMPS, in block diagram form.

FIG. 1 shows an example of a circuit arrangement 100 for controlling a switch mode power supply in operation, in block diagram form. The secondary side circuit of an SMPS which produces a voltage Vout_before_L, is shown in block 110. In this example, the SMPS is a resonant converter with a split secondary winding 115, 116. As will be familiar to the skilled person, the output diodes 117, 118 may be replaced by synchronous rectification switches. The output Vout_before_L is directed through a filter network 120 of inductors and capacitors, which may be as shown at L1, L2, C1, C2 and C3, to result in a relatively smoother output voltage Vout. The circuit includes a resistive divider block 130, to provide a scaled version, ref, of the output voltage Vout to a proportional-integrating (PI) error amplifier 140. The error amplifier 140 may be implemented, for example, as a TL 431 type of error amplifier, and includes one or more capacitors (shown as C4 and C5). Such an error amplifier typically has a fixed reference voltage Vref, supplied by Zener diode shown at 142. The output of the error amplifier is, as shown, Vcath.

Current from the output Vout_before_L is also routed, through resistor 160, to the source LED 152 of an opto-coupler 150. Note that in this figure only the source (LED) side of the opto-coupler is shown; the output side of the opto-coupler, comprising a photodector to detect the level of current in the LED, and which is on the primary side of the SMPS, is not shown.

Resistor 160 may be also be referred to as the "fast lane" of the PI error amplifier. It determines the "proportional" P part of the behaviour. The P action sets the required loop bandwidth. The skilled person would appreciate that although as shown in the figure the resistor is between the output node of the SMPS and the opto-coupler, in other configurations the resistor may be between the opto-coupler and the error amplifier, and thus directly form part of the feedback network of the error amplifier. Whereas the "P" action sets the required loop bandwidth, the "I" (integration) action—defined primarily by the integrated capacitors C4 and C5—gives a zero offset from the desired output voltage.

Looking in more detail at capacitor network 120, the capacitors in this network act as filtering or stabilising capacitors at normal operating switching frequencies to reduce the ripple on the output Vout, but do not significantly affect operation of the error amplifier. In contrast, the integrating capacitor (or capacitors) C4, C5 of the PI error amplifier 140 helps to ensure loop stability for the error amplifier at normal operating frequencies, whilst the loop bandwidth is primarily defined by the "fast lane" resistor 160.

Figure 2:
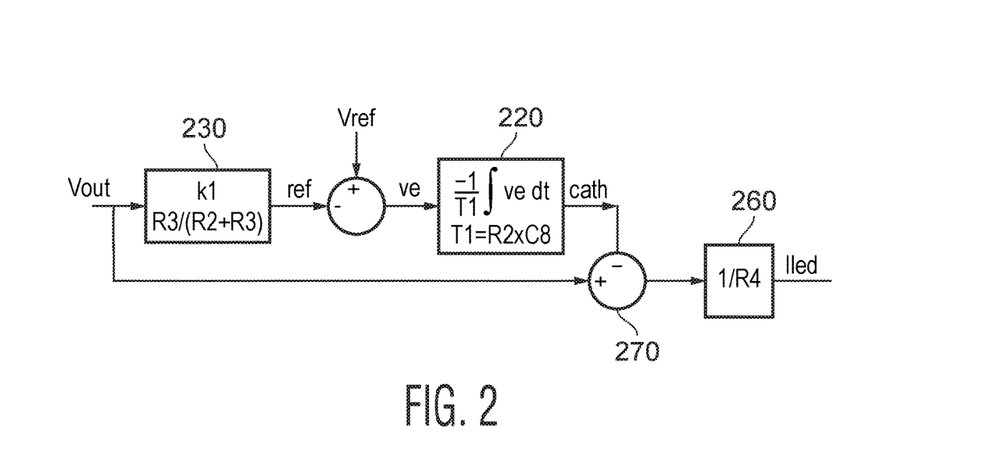
FIG. 2 shows, in functional block form, operation of the circuit of FIG. 1.

Operation of this circuit is shown in schematically in FIG. 2, in block form; Vout is converted to a current ILED and scaled by the resistor 160 (R4), corresponding to the left-hand side of FIG. 1, shown in the lower part of the figure. In an additional (upper) path, Vout is scaled by a factor k1 defined by the resistive divider 130, as shown in block 230. The result is combined with a reference voltage Vref defined in the error amplifier (as shown at 142), and integrated in integrator 220, defined by the integrating capacitor(s) C4 and C5. In an example error amplifier, Vref may be based on a fixed voltage of 2.5V, and the intended output voltage of the SMPS is then defined by the ratio 2.5/k1. The result of the integration is subtracted from the output voltage in combiner 270 before being passed to the "fast Lane" resistor 160, shown at 260. As already stated, in normal operation the fast Lane resistor 160 on the lower half of the figure defines the loop bandwidth at normal operation frequencies; the upper half of the figure provides stability for the error amplifier.

At low loads, SMPS such as that shown above are typically operated in discontinuous conduction mode (DOM). An example of a discontinuous conduction mode is burst mode, wherein the converter is operated in bursts: one conversion cycle, or a group of conversion cycles, is separated from the next one (or group of) conversion cycles, by an interval. That is to say the conversion cycle or group of conversion cycles is considered as a "burst". The repetition time between bursts may be considered as the burst interval, and the frequency with which bursts occur may be termed the burst frequency.

With decreasing outputs load and maintaining the same energy transfer for each burst, the burst frequency is reduced, that is to say the time between bursts is increased. Even if the current required by the opto-coupler was constant, this current would then become of increasing significance as a contributor to the losses in the SMPS. However, as will be described below, the current in the opto-coupler tends to increase with decreasing burst frequency, and thus the losses are typically even higher.

Figure 3:
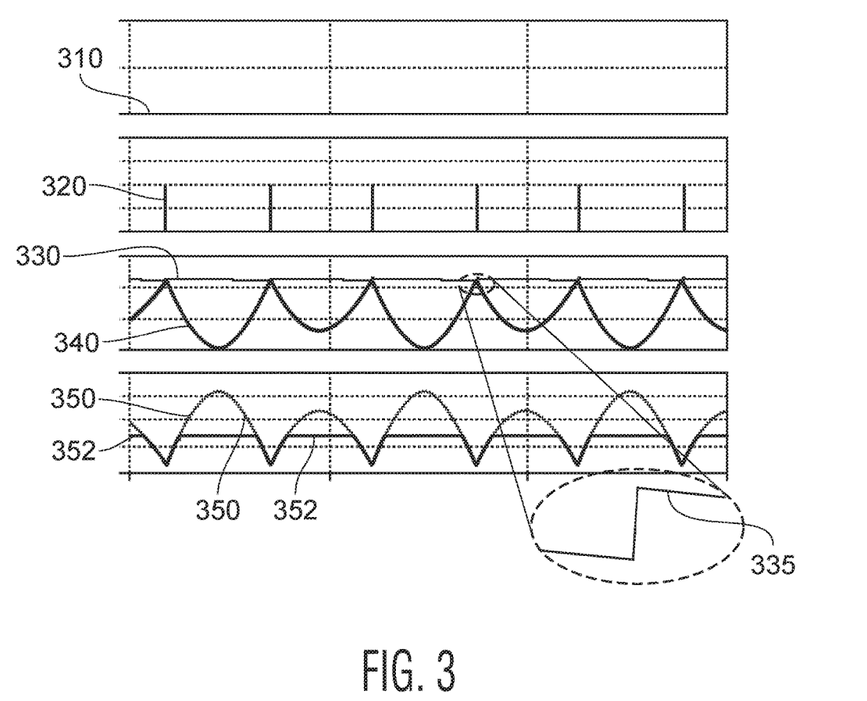
FIG. 3 shows various waveforms associated with FIG. 1.

FIG. 3 shows the various waveforms associated with the circuit described above, in the case that such a circuit is operated in burst mode. The top curve 310 shows a constant reference voltage Vref, which is the intended average output voltage. The second curve shows periodic individual bursts 320 (corresponding to a control signal "burst-on"). The third curve 330 shows the output voltage of SMPS. At each burst the output voltage rises, by an amount which is determined by the energy transferred in that burst. In order to aid the understanding of the present disclosure, a "burst" will be considered hereinunder as a single conversion cycle. Nonetheless the skilled person will appreciate that a person may comprise a group of conversion cycles as described above. Between bursts, the voltage falls slowly. The rate of change of voltage depends on the output load, and in the example shown with widely spaced bursts, corresponding to very low load output, the rate of change is very shallow. Since this rate of change may be too shallow to be detectable on plot 330, an enlarged insert is shown, around a single burst, at 335.

Curve 340 shows a voltage Vcath at the output of the error amplifier. Immediately after a burst, the slope (that is to say the derivative) of Vcath is proportional to the difference between the actual output voltage at that moment and the intended output voltage (Vout−Voutref), where Voutref is defined as Vref/k1: at this moment the error current produced by the error amplifier is proportional to (Vout−Voutref), and this error current defines the charging rate of the integrating capacitor(s) C4+C5, and thus dv/dt, or the slope, of Vcath. In the hypothetical case that the error amplifier was a proportional error amplifier (P-error amplifier), the shape of Vcath would follow that of (an inverted copy of) Vout. However, it is apparent that the Vcath does not follow the linear path, but rather a parabolic path. This may be explained through the integrating action of the PI error amplifier: the integrator integrates the (linear) difference between Vout and Voutref (or their scaled equivalents ref and Vref), to result in a parabolic output at Vcath.

Curve 350 shows the current ILED in the opto-coupler LED. The difference (Vout−Vcath) generates the current in the error amplifier and thus in the opto-coupler. Thus since Vcath is parabolic, then also ILED is parabolic. As shown, the current ILED may be truncated, for instance in order to protect the opto-coupler, as shown at 352. Nonetheless, it is apparent from curve 350, that the current in the opto-coupler may be relatively high. For example, the peak current in the LED may be as high as 4 mA at no load situation when the SMPS is operating with a burst period of 50 msec, The conclusion is that even if the opto-coupler current level chosen to define the burst-on time is set very low (say, perhaps 80 µA), the average opto-coupler current can be several milliamps: for example, consider an average opto-coupler LED current of 2 mA drawn from an output voltage of 12V. Due to the long time between bursts, the parabolic nature of ILED, and the fact that the rate of change of this current is fixed at the start of the burst interval, this gives an additional contribution to the power dissipation of 24 mW at the secondary side—and a part of that at the primary side. For applications with a higher output voltage such as adapters for laptops (at 19V) the power dissipated may be even higher. Such dissipation gives a serious limitation on the minimum value that can be reached for the no load input power of the converter.

It may be possible to reduce the power during the burst on interval and therefore getting a shorter burst period and therefore lower peak current and average opto-coupler current, but a lower power level during the burst on time also means lower efficiency at which the residual load must be delivered.

According to a first aspect of the present disclosure, there is provided a control arrangement for a switch mode power supply operable in a burst mode. The power supply may also be operable in a normal mode which is not a burst mode. The power supply comprises an opto-coupler configured to transfer a control signal from a secondary side to a primary side of the switch mode power supply. The control signal is transferred by means of an LED current in the opto-coupler, and is associated with a time-varying error between a reference signal and a signal indicative of an actual value of an output parameter such as output voltage.

The control arrangement comprises an error amplifier configured to operate as a proportional-integrating error amplifier, which may, for instance, be an error amplifier such as a TL431 from NXP Semiconductors, configured to operate as a proportional-integrating error amplifier. The proportional-integrating error amplifier is configured to determine the LED current from the time-varying error. The control arrangement further comprises a feedback loop configured to adjust the magnitude of the LED current between bursts by modifying the time-dependant error. As already mentioned operation as a PI error amplifier does not preclude other functionality, and in particular the addition of differentiation may be possible.

As discussed above, absent such a control arrangement, the integrator of the proportional-integrating error amplifier can result in a large peak LED current between bursts. By modifying the time-dependant error, the LED current can be reduced or limited.

One way of achieving this is to detect, for instance by directly sensing, whether the switch mode power supply is operating in a burst mode and is in a state between bursts, and on detecting that the power supply is in such a state, to use the feedback loop to directly clamp or limit the LED current in the opto-coupler. It has already been shown above at 352 that the current may be truncated or limited; it may be possible to re-use such circuitry to limit or truncate the current to a much lower value between bursts. However, in such embodiments it is also necessary to determine whether the power supply is in fact between bursts, in order to know when to limit the LED current; this would require additional circuitry or complexity and thus result in additional cost for the device. The determination may be done in various ways, which will immediately apparent to the skilled person. For instance, for power supplies which include a "burst-on" flag or signal, this may be monitored, and provided it is known that the power supply is operated in burst mode, the absence of a "burst-on" flag would indicate that the power supply is between bursts. In other embodiments a timer may be used: if Vout does not start to rise before the timeout period has elapsed, it may be deduced that the power supply is operating in a burst mode and is between bursts.

In one or more other embodiments, which will be described in more detail hereinbelow, the feedback loop is configured to modify the time-dependent error by adding a time-dependent offset to the reference signal. An example of such an embodiment is shown in FIG. 4, and in block diagram in FIG. 5A, FIG. 5A is similar to FIG. 2 but includes the feedback loop defined by resistor R7, 580, as will be described in more detail below.

Figure 4:
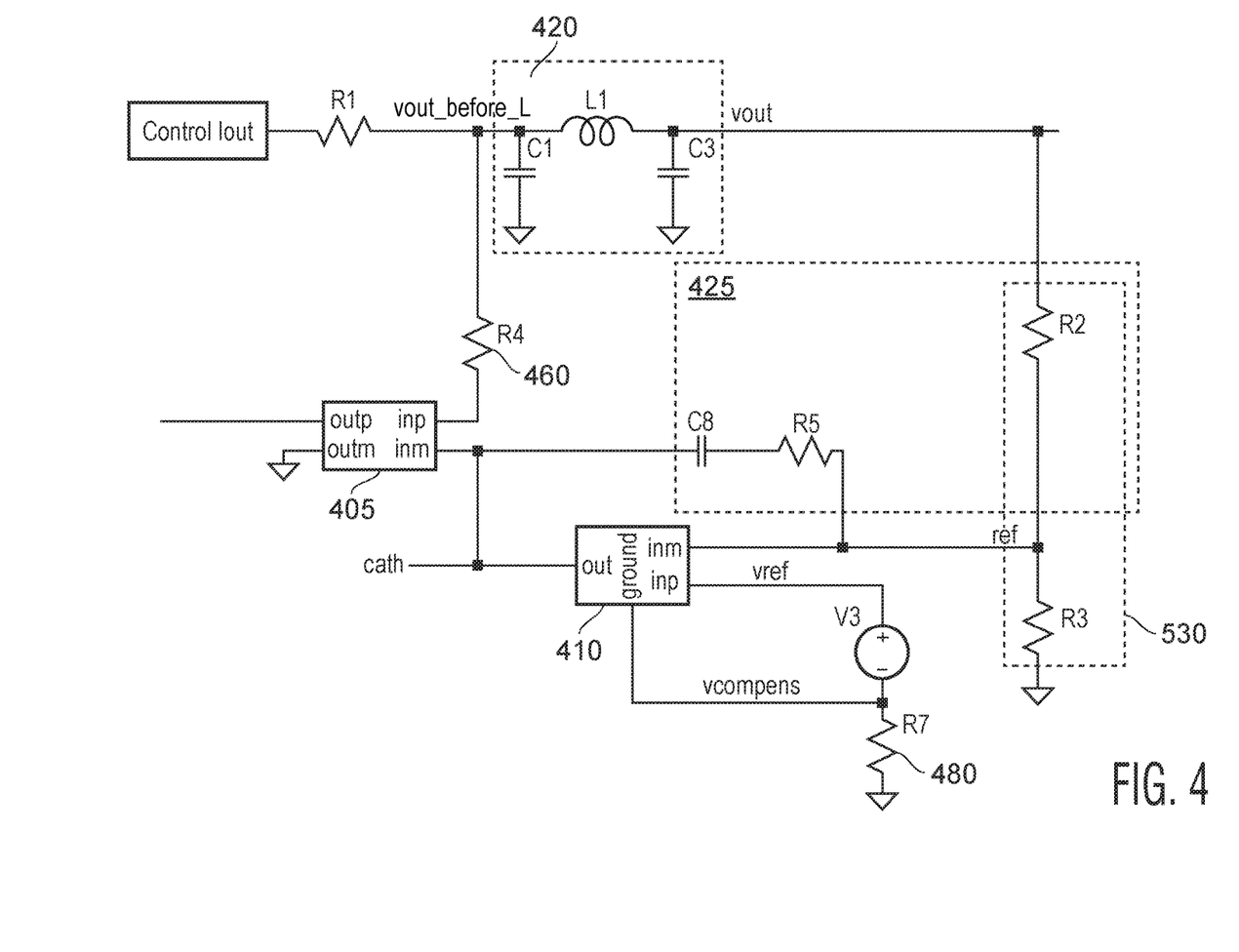
FIG. 4 shows an example of a circuit including a control arrangement for controlling a SMPS according to one or more embodiments in block diagram form.
Figure 5A:
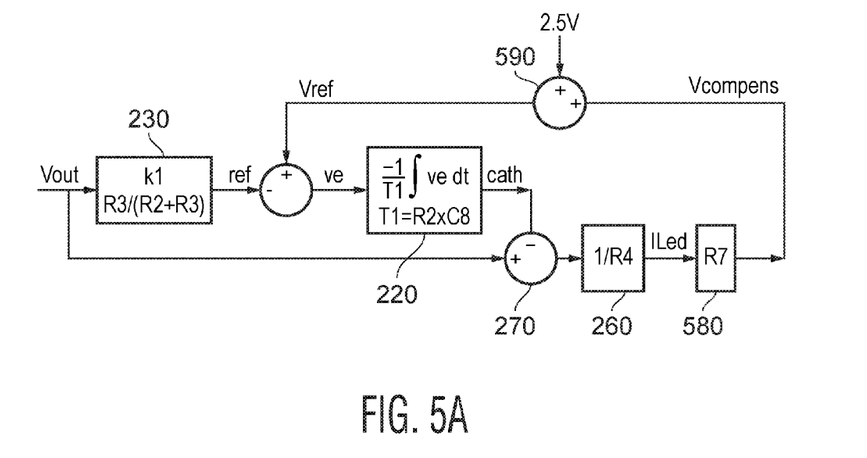
FIG. 5A shows, in functional block form, operation of the circuit of FIG. 4.

FIG. 4 shows the error amplifier 410, such as TLA 431, which is configured to operate as a proportional integrating error amplifier by inclusion of integrator 425 defined through resistor R5 and capacitor C8. A fast lane, or proportional, resistor 460 is connected in series with the LED (source) side of opto-coupler 405. The error amplifier 410 is connected on the ground side of the opto-coupler. The ground connection of the error amplifier however, is not directly connected to ground, but instead resistor R7, shown at 480 in FIG. 4, is connected in the ground path, between the error amplifier and ground. The circuit includes a filter network 420 to smooth the output voltage Vout. Vout is scaled by a resistive divider 530, and the scaled version supplied to the error amplifier 410.

The operation of the circuit as shown in FIG. 4 will now be described with reference to FIG. 5A, which shows relevant parts of the circuit in block form. As already described, this circuit is similar to that shown in FIG. 2 with the addition of the resistor R7 580, which converts the LED current LED into a voltage Vcompens. In contrast to the circuit shown in FIG. 2, the reference signal Vref is no longer directly equal to the preset reference level. Instead. Vcompens forms a time-dependent offset to the preset reference level (which may be as shown 2.5V), to result in the reference signal (Vref). The offset is added in adder 590.

The resulting reference signal Vref is compared with the signal (ref) indicative of an actual value of the output voltage. In this embodiment, the signal indicative of an actual value of the output voltage is a scaled version of Vout, being scaled by a factor k1, defined by the resistive divider formed by resistors R2 and R3.

Figure 6:
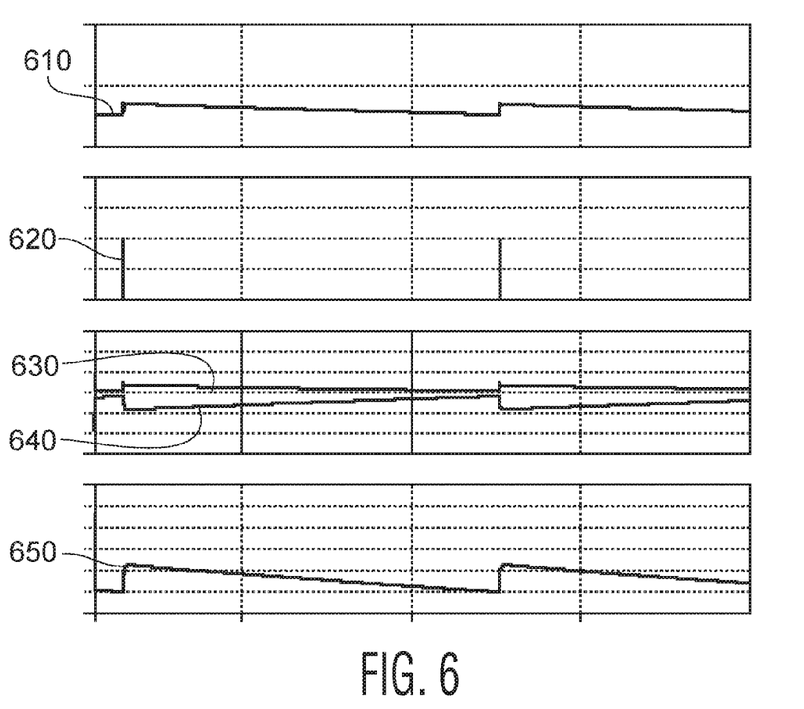
FIG. 6 shows various waveforms associated with FIG. 4.

Various waveforms associated with the circuit of FIGS. 4 and 5A are shown in FIG. 6. Similar to those shown in FIG. 3, the figure shows the curve for Vref at 610; the second curve shows periodic individual bursts 620 (corresponding to a control signal "burst-on"); the third curve 630 shows the output voltage Vout of the SMPS; curve 640 shows a voltage Vcath at the output of the error amplifier and finally curve 650 shows the current ILED in the opto-coupler LED.

As can be seen from curve 610, the voltage at node Vref is now not fixed anymore, but follows the triangle voltage shape of Vout (shown at 630), due to the additional feedback signal injected. As a result, the voltage Vcath at 640, has now changed from a parabolic shape to a triangular shape with a much smaller peak value compared to that shown in FIG. 3. Therefore the current in the opto-coupler has significantly reduced, relative to that shown in FIG. 3. Using the same example described above with reference to FIG. 3, the additional power consumption is now only 80 µA×20V at the primary side and 450 µA×12V at the secondary side. The total power lost is then only 6.4 mw, which is a factor of 4 lower than the loss (24 mW) associated with the circuit shown in FIG. 2.

Figure 5B:
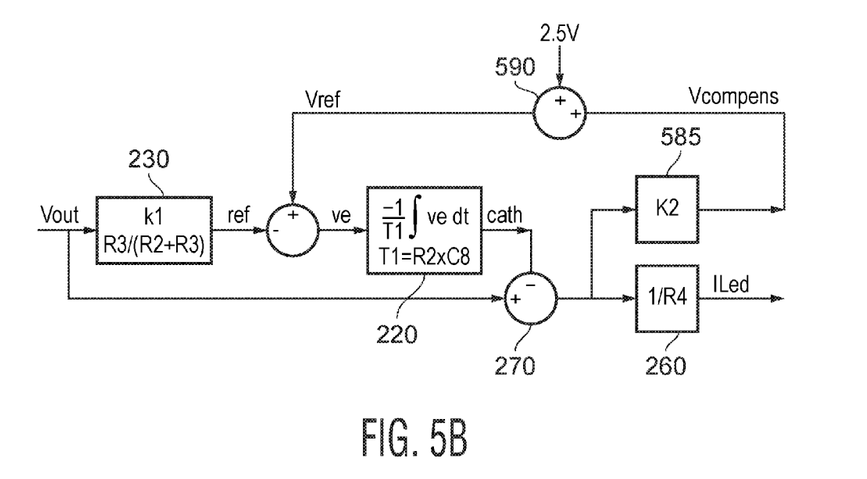
FIG. 5B shows, in functional block form, operation of a similar circuit.

A variation of the circuit is shown, in functional block form, in FIG. 5B. This circuit is similar to that shown in FIG. 5A, except that the feedback loop is not taken from the ILED current, but from the voltage at (vout-cath). This voltage is scaled by a factor k2 to provide the signal Vcompens. Then:

$$Vcompens = k2 \times (Vout-cath).$$

The compensation voltage Vcompens still acts to adjust the magnitude of the LED current between bursts, by modifying the time-dependant error, and in particular by adding a time-dependant offset to the reference signal.

In order to determine by how much to modify the time-dependent error, in order to provide an optimal solution, and in particular with reference to the embodiment just described to choose the value of R7 to provide the time-dependent offset to the reference signal, the following calculation that may be carried out:

First, note that $ve = k1 \cdot Vout - Vcompens$ (1)

and that $$vcompens = \frac{R7}{R4} \cdot (Vout - Vcath). \quad (2)$$

Defining an integrating time T1 by T1=R2·C8 (neglecting R5), then $$Vcath = \frac{-1}{s \cdot T1} \cdot (ve) \quad (3)$$

$$ILED = \frac{Vout - Vcath}{R4} = \frac{vcompens}{7} \quad (4)$$

So $$\frac{ILED}{Vout} = \frac{\left(1 + \frac{T1}{k1} \cdot s\right) \cdot k1}{\left(1 + \frac{R4}{R7} \cdot T1 \cdot s\right) \cdot R7}. \quad (5)$$

Then defining two frequencies F1,F2, by:

$$F1 = \frac{1}{2\pi} \cdot \frac{k1}{T1} \quad (6)$$

and $$F2 = \frac{1}{2\pi} \cdot \frac{R7}{T1 \cdot T4}, \quad (7)$$

results in, for Frequencies<F1,F2.

$$\frac{ILED}{Vout} = \frac{k1}{R7}. \quad (8)$$

And, for frequencies>F1,F2:

$$\frac{ILED}{Vout} = \frac{1}{R4}. \quad (9)$$

These calculations show that for frequencies in the order of magnitude of the loop bandwidth the gain—from Vout to ILED—is 1/R4, which is the same gain (fast lane) as without the current feedback. For lower frequencies, corresponding to a burst frequency, the gain from Vout to LED current is k1/R7. This allows setting the opto-coupler peak current by choosing an appropriate value for the feedback by R7, since the ratio between ripple voltage at the output and opto-coupler current is now set by R7. The result is that the parabolic shape is replaced by a triangular shape whose amplitude does not depend on the burst frequency any more. This may allow for a very low burst frequency and may allow optimizing the converted power during the burst on interval to meet optimum efficiency setting. A typical value of R7 may be between 10Ω and 50Ω: in a particular example a value of 20Ω was found to be effective.

In one of more embodiments, the burst mode has a repetition period which is longer than 50 ms, and frequency which is less than 20 Hz: typically for audible noise reasons a burst-mode frequency is somewhere below 1-2 kHz. At the specific case of no load, the repetition frequency may be much lower, and may even be less than 25 Hz. Of course, it will be appreciated that the burst on time cannot be shorter than 1 switching cycle. For efficiency reasons, the power during that 1 switching cycle (with Tper of approximately 50 µsec) will generally be kept at a relatively high level, for example 10% of the full load level. The full load level could, in a typical application, be over the order of 300 Watt. At no load, the power required is typically of the order of 50 mWatt, so a duty-cycle will be:

50 mW/(300 W*10%)=1.7×10$^{-3}$.

Taking as an example a 50 µsec period time of the switching cycle this gives burst-period, or burst repetition time of: 50 µs/1.7×10$^{-3}$=30 msec.

Figure 7:
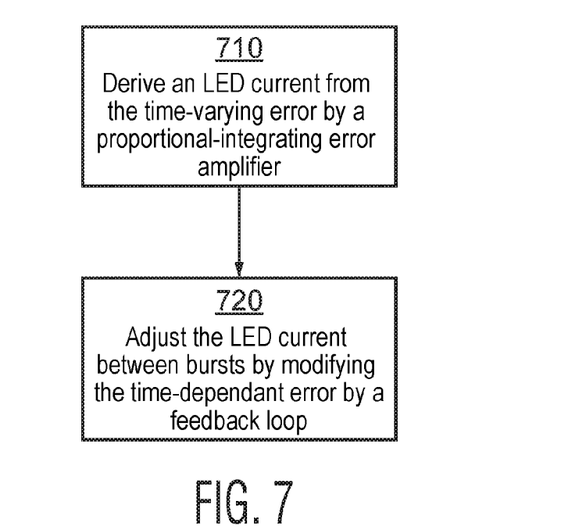
FIG. 7 shows a method according to one or more embodiments.

FIG. 7 shows a flowchart according to one or more embodiments. In particular, the flowchart of FIG. 7 shows a method of controlling a switch mode power supply operable in a burst mode and comprising an opto-coupler configured to transfer, from a secondary side to a primary side of the switch mode power supply by means of an LED current, a control signal indicative of a time-varying error between a reference signal and a signal indicative of an actual value of an output parameter. The method comprises, in step 710 deriving an LED current from the time-varying error by a proportional-integrating error amplifier; and in step 720, adjusting the magnitude of the LED current between bursts by modifying the time-dependant error by a feedback loop.

From reading the present disclosure, other variations and modifications will be apparent to the skilled person. Such variations and modifications may involve equivalent and other features which are already known in the art of control arrangements for switch mode power supplier, and which may be used instead of, or in addition to, features already described herein, In particular, the skilled person will appreciate that although the figures have shown the secondary side of a resonant converter, the invention is not limited to resonant converters but may be equally applicable to other types of converters such as will readily come to mind, and without limitation fly back, buck converters.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

LIST OF REFERENCE SIGNS

100 circuit arrangement
110 SMPS secondary side circuit
115 secondary winding
116 seconding winding
117 output diode
118 output diode
120 filter network
130 divider block
140 error amplifier
142 Vref
150 opto-coupler
152 opto-coupler source LED
220 integrator
230 resistive divider scaling
260 resistor R7 current conversion block
270 combiner
310 Vref curve
320 burst-on curve
330 Vout curve
335 enlarged part of Vout curve
340 Vcath curve
350 ILED curve
352 truncated ILED curve
405 opto-coupler
410 error amplifier
420 filter network
425 integrator
460 proportional resistor R4
480 feedback resistor R7
530 resistive divider
580 feedback resistor R7 block
590 adder
610 Vref curve
620 burst-on curve
630 Vout curve
640 Vcath curve
650 ILED curve

The invention claimed is:

1. A control arrangement for a switch mode power supply ("SMPS") operable in a burst mode, comprising:
   an opto-coupler connected to a proportional-integrating error amplifier configured to transfer, from a secondary side to a primary side of the SMPS through an LED current, a control signal indicative of a time-varying error between a reference signal and a signal indicative of an actual value of an output parameter,
   the proportional-integrating error amplifier connected to a ground side of the opto-coupler configured to determine the LED current from the time-varying error; and
   a feedback loop including a resistor connected between a ground connection of the proportional-integrating error amplifier and a ground connection configured to reduce a magnitude of the LED current between bursts in the burst mode by modifying a reference signal portion of the time-varying error by using an adder to add a time-dependent offset to the reference signal portion derived in the proportional-integrating error amplifier from the LED current to prevent the LED current from increasing during a normal mode.

2. The control arrangement according to claim 1, wherein the output parameter is output voltage.

3. The control arrangement according to claim 1, wherein an integrator, included in the proportional-integrating error amplifier, integrates the time-varying error and the time-dependent offset to adjust the magnitude of the LED current.

4. The control arrangement according to claim 1, wherein the feedback loop is arranged to modify an integrating function of the proportional-integrating error amplifier.

5. The control arrangement according to claim 1, wherein the resistor is in the ground connection of the proportional-integrating error amplifier.

6. The control arrangement according to claim 5, wherein the resistor is in a current path of the LED current.

7. The control arrangement according to claim 1, wherein the resistor has a value between 10 ohms and 100 ohms.

8. The control arrangement according to claim 1, wherein the burst mode has a repetition frequency which is no more than 100 Hz.

9. A switch mode power supply, comprising a control arrangement as claimed in claim 1 and an opto-coupler.

10. The control arrangement as claimed in claim 1, wherein, in burst mode, the control signal is used on the primary side to determine a timing between successive bursts.

11. A method of controlling a switch mode power supply ("SMPS") operable in a burst mode, the method comprising:
- transferring, by an opto-coupler connected to a proportional-integrating error amplifier, from a secondary side to a primary side of the SMPS through an LED current, a control signal indicative of a time-varying error between a reference signal and a signal indicative of an actual value of an output parameter,
- determining, by the proportional-integrating error amplifier connected to a ground side of the opto-coupler, an LED current from the time-varying error; and
- reducing, by a feedback loop including a resistor connected between a ground connection of the proportional-integrating error amplifier and a ground connection, a magnitude of the LED current between bursts in burst mode by modifying a reference signal portion of the time-varying error by using an adder to add a time-dependent offset to the reference signal portion derived in the proportional-integrating error amplifier from the LED current to prevent the LED current from increasing during a normal mode.

12. The method of claim 11, wherein adjusting the magnitude of the LED current is effected in the feedback loop.

13. The method of claim 11, wherein the feedback loop comprises a resistor in the ground connection of the proportional-integrating error amplifier.

* * * * *